United States Patent
Liao et al.

(10) Patent No.: US 9,733,675 B2
(45) Date of Patent: Aug. 15, 2017

(54) ELASTIC BODY AND ELECTRONIC DEVICE

(71) Applicant: HTC Corporation, Taoyuan County (TW)

(72) Inventors: Yu-Jing Liao, Taoyuan County (TW); Chih-Wei Tu, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 108 days.

(21) Appl. No.: 14/181,734

(22) Filed: Feb. 17, 2014

(65) Prior Publication Data

US 2015/0234432 A1  Aug. 20, 2015

(51) Int. Cl.
*G06F 1/16* (2006.01)

(52) U.S. Cl.
CPC .......... *G06F 1/1656* (2013.01); *G06F 1/1613* (2013.01); *G06F 1/1658* (2013.01); *Y10T 428/24322* (2015.01)

(58) Field of Classification Search
CPC .......... H04M 1/18; H04M 1/23; H04M 1/236; H04M 1/0274; H04M 1/0239; G06F 1/1656; G06F 1/1658; G06F 1/1613; Y10T 428/24322
USPC .......... 361/679.56; 428/137; 455/550.1, 566, 455/575.8
See application file for complete search history.

(56) References Cited

U.S. PATENT DOCUMENTS

| | | | | |
|---|---|---|---|---|
| 6,275,215 B1 * | 8/2001 | Kim | ..................... | G06F 3/03543 345/163 |
| 6,872,881 B2 * | 3/2005 | Horng | ................... | H05K 9/0035 174/384 |
| 6,903,725 B2 * | 6/2005 | Nacson | ................ | G06F 3/03543 345/156 |
| 7,697,281 B2 * | 4/2010 | Dabov | ................... | G06F 1/1626 361/679.55 |
| 8,067,843 B2 * | 11/2011 | Lai | ....................... | G06F 3/03543 290/1 R |
| 8,537,543 B2 * | 9/2013 | Wang | .................. | H04M 1/0249 361/679.26 |

(Continued)

FOREIGN PATENT DOCUMENTS

TW    M323725    12/2007
TW    M326261    1/2008

(Continued)

OTHER PUBLICATIONS

"Office Action of China Counterpart Application", issued on Aug. 3, 2016, p. 1-p. 6.

*Primary Examiner* — Dimary Lopez Cruz
*Assistant Examiner* — Matt Dhillon
(74) *Attorney, Agent, or Firm* — Jianq Chyun IP Office

(57) ABSTRACT

An elastic body and an electronic device are provided. The electronic device includes a casing, an electronic component, and a conductive base. The electronic component and the conductive base are installed in the casing. The conductive base includes a base body and the elastic body. The base body has a first opening. The elastic body includes a bottom plate and an elastic part. The bottom plate is installed on the base body and has a second opening. The first opening is communicated with the second opening. The elastic part is connected to the bottom plate and has a contacting portion. The contacting portion is installed corresponding to the second opening, and the contacting portion contacts the electronic component.

11 Claims, 3 Drawing Sheets

(56) References Cited

U.S. PATENT DOCUMENTS

| | | | | | |
|---|---|---|---|---|---|
| 8,599,137 | B2* | 12/2013 | Rayner | ............... | G06F 1/26 |
| | | | | | 345/167 |
| 8,632,363 | B2* | 1/2014 | Jol | ............... | H01R 43/0221 |
| | | | | | 439/607.17 |
| 8,744,535 | B2* | 6/2014 | Chen | ............... | H04M 1/233 |
| | | | | | 455/556.1 |
| 8,861,772 | B2* | 10/2014 | Huang | ............... | H04R 1/10 |
| | | | | | 361/679.01 |
| 8,880,129 | B2* | 11/2014 | Lee | ............... | H04M 1/0249 |
| | | | | | 361/679.01 |
| 9,004,333 | B2* | 4/2015 | Monaco | ............ | A45C 11/00 |
| | | | | | 206/320 |
| 9,007,758 | B2* | 4/2015 | Wilson | ............ | H04M 1/026 |
| | | | | | 248/918 |
| 9,137,915 | B2* | 9/2015 | McCurdy | ......... | A45C 13/002 |
| 2007/0081303 | A1* | 4/2007 | Lam | ............... | G06F 1/1626 |
| | | | | | 361/679.4 |
| 2009/0257189 | A1* | 10/2009 | Wang | ............ | H04M 1/0249 |
| | | | | | 361/679.56 |
| 2010/0045593 | A1* | 2/2010 | Washio | .......... | H01H 25/008 |
| | | | | | 345/156 |
| 2010/0079404 | A1* | 4/2010 | Degner | .......... | G06F 3/03547 |
| | | | | | 345/174 |

FOREIGN PATENT DOCUMENTS

| | | |
|---|---|---|
| TW | M329260 | 3/2008 |
| TW | M467208 | 12/2013 |

\* cited by examiner

ELASTIC BODY AND ELECTRONIC DEVICE

BACKGROUND OF THE DISCLOSURE

1. Field of the Disclosure

The disclosure generally relates to an elastic body and an electronic device, and more particularly to an elastic body having a bottom plate which includes an opening and an electronic device utilizing the elastic body having the bottom plate which includes the opening.

2. Description of Related Art

As technology advances and develops, various kinds of electronic devices, such as mobile phones, tablet computers, and electronic books (eBooks), etc., have been extensively used. These electronic devices not only make people's life more convenient, but also have become an indispensable part to people's life.

In the foregoing electronic device, an elastic body is installed between a circuit board and an electronic component, so as to electrically conduct the circuit board and the electronic component. However, in response to the trend of thinning design of the electronic device, how to thinning the structure of the elastic body while not compromising the reliability has become an issue that the electronic device manufacturers are eager to resolve.

SUMMARY OF THE DISCLOSURE

The disclosure provides an elastic body which has a thin structure.

The disclosure provides an electronic device which utilizes the aforementioned elastic body and fulfills the thinning design requirements.

The elastic body according to the disclosure includes a bottom plate, a position limiting portion, and an elastic part. The bottom plate has an opening. The position limiting portion is connected to the bottom plate and extends toward the opening. The elastic part is connected to the bottom plate and includes a contacting portion, wherein the contacting portion is installed corresponding to the opening, and a distance between the contacting portion and the bottom plate is kept by the position limiting portion.

The electronic device according to the disclosure includes a casing, an electronic component, and a conductive base. The electronic component and the conductive base are installed in the casing. The conductive base includes a base body and an elastic body. The base body has a first opening. The elastic body includes a bottom plate and an elastic part. The bottom plate is installed on the base body and has a second opening. The first opening is communicated with the second opening. The elastic part is connected to the bottom plate and has a contacting portion. The contacting portion is installed corresponding to the second opening, and the contacting portion contacts the electronic component.

Accordingly, in the elastic body and the electronic device according to the disclosure, the bottom plate and the body base have openings that are communicated with each other. When an external force is applied to the contacting portion of the elastic body, the elastic part can be accommodated in the two openings. Therefore, the overall thickness of the conductive base can be reduced in order to fulfill the thinning design requirement of the electronic device.

To make the above features and advantages of the disclosure more comprehensible, several embodiments accompanied with drawings are described in detail as follows.

DESCRIPTION OF THE EMBODIMENTS

Figure 1:
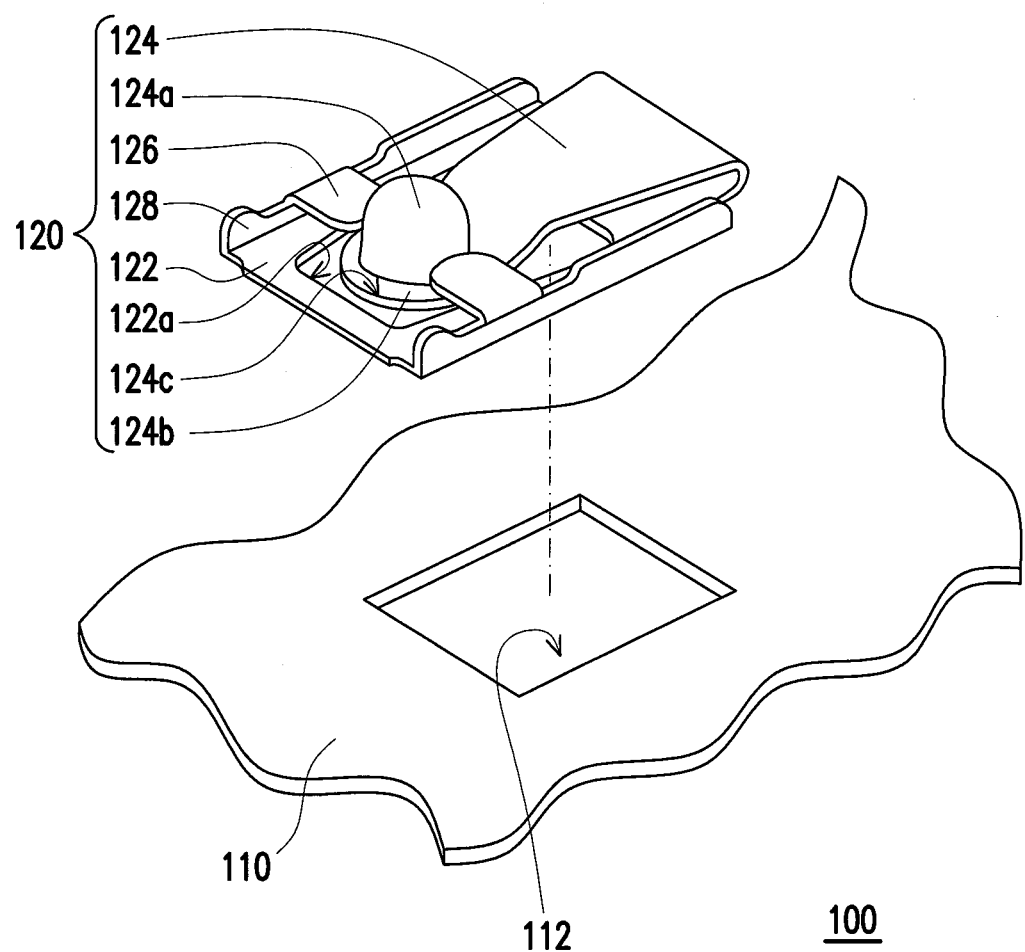
FIG. 1 is a schematic view of a conductive base utilizing an elastic body according to an embodiment of the disclosure.
Figure 2:
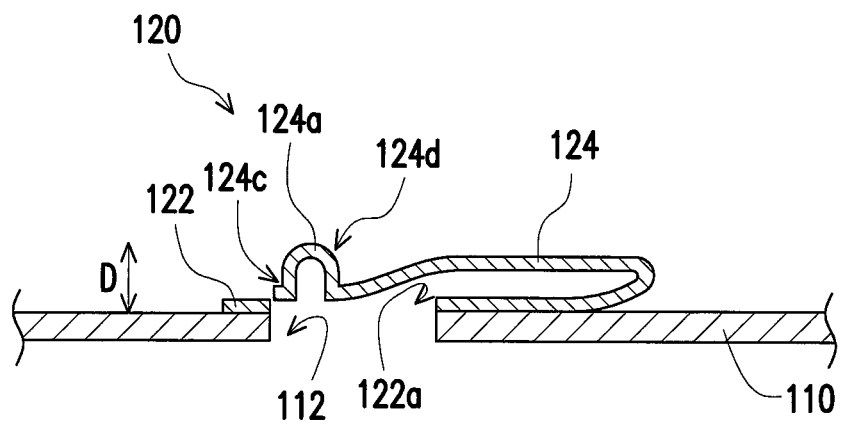
FIG. 2 is a schematic cross-sectional view of the elastic body assembled on the conductive base in FIG. 1.

FIG. 1 is a schematic view of a conductive base 100 utilizing an elastic body 120 according to an embodiment of the disclosure. FIG. 2 is a schematic cross-sectional view of the elastic body 120 assembled on the conductive base 100 in FIG. 1. Referring to FIG. 1 and FIG. 2, in the present embodiment, the elastic body 120 may be utilized in the conductive base 100 of an electronic device (please refer to FIG. 4 first). The conductive base 100 includes a base body 110 and an elastic body 120. A circuit can be installed on a surface or in the internal of the base body 110, and both the base body 110 and the elastic body 120 may be manufactured by conductive materials such that they are electrically connected to each other. The base body 110 has a first opening 112. The elastic body 120 includes a bottom plate 122 and an elastic part 124. The bottom plate 122 is installed on the base body 110 and has a second opening 122a. The first opening 112 is communicated with the second opening 122a. The elastic part 124 is connected to the bottom plate 122 and has a contacting portion 124a. The contacting portion 124a is disposed corresponding to the second opening 122a and can be located above the second opening 122a. It is worth to note that in order to make the drawing simple, only part of the base body 110 is illustrated in FIG. 1 and FIG. 2.

Figure 4:
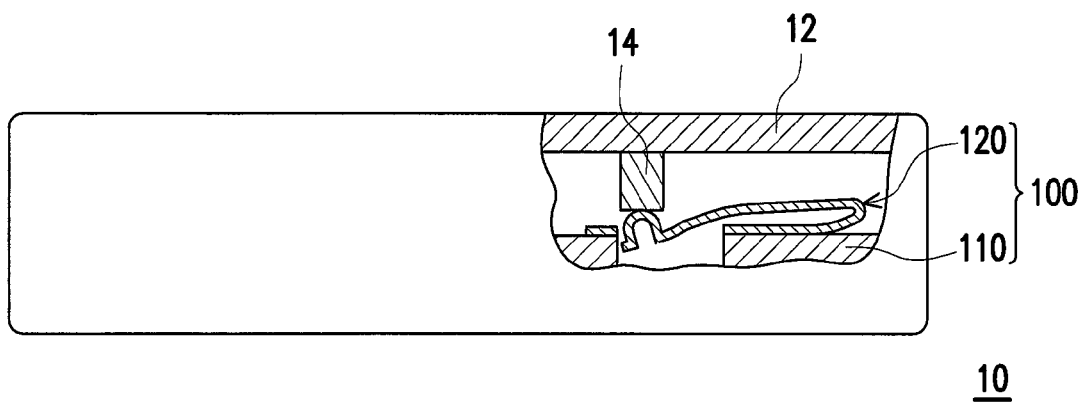
FIG. 4 is a schematic view of an electronic device utilizing the aforementioned conductive base according to an embodiment of the disclosure.

FIG. 4 is a schematic view of an electronic device utilizing the aforementioned conductive base according to an embodiment of the disclosure. Referring to FIG. 4, the conductive base 100 of the present embodiment may be applied to electronic devices 10 such as mobile phones, tablet computers, or eBooks, etc. The electronic device 10 includes a casing 12 and the conductive base 100 and an electronic component 14 installed in the casing 12. After the electronic component 14 of the electronic device 10 contacts the elastic body 120, the base body 110 can be electrically connected to the electronic component 14 to achieve certain functions. The electronic component 14 is, for example, antenna, battery, or metal casing of the electronic component 14, etc. For instance, when the elastic body 120 is abutted between the base body 110 and the antenna, the signal received by the antenna would be transmitted to other electronic components on the conductive base 100, so as to provide communication function. When the elastic body 120 is abutted between the base body 110 and the battery, the electricity provided by the battery can be transferred to other electronic components on the conductive base 100. When the elastic body 120 is abutted between the base body 110 and the metal casing of the electronic component, the metal casing of the electronic component can be grounded, thereby resolving the problem of electromagnetic interference (EMI) and electrostatic discharge (ESD).

Figure 3:
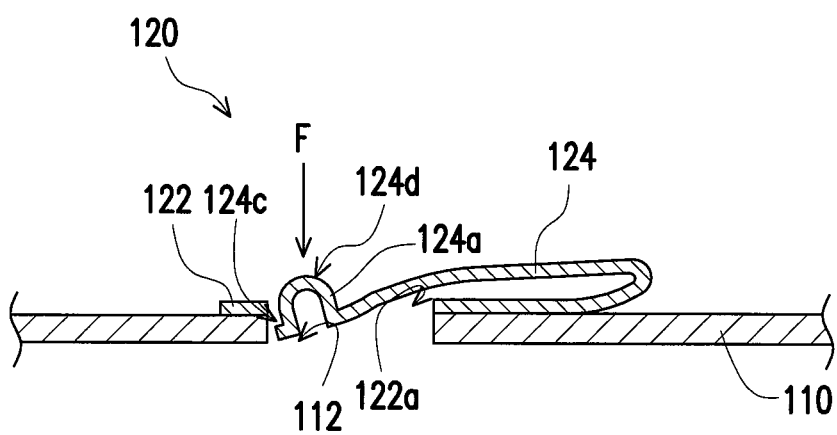
FIG. 3 is a schematic view of the elastic body in FIG. 2 when force is applied.

FIG. 3 is a schematic view of the elastic body in FIG. 2 in a forced state. Referring to FIG. 1 and FIG. 3, when the electronic component 14 (referring to FIG. 4) of the electronic device 10 contacts the contacting portion 124a of the elastic part 124 and applies a force F, the elastic part 124 would bend with respect to the bottom plate 122. The free end of the elastic part 124 would sink into the second opening 122a, or even, sink into the first opening 112. Since the space formed by the first opening 112 and the second opening 122a can accommodate the elastic part 124 of the elastic body 120 when the force is applied, the overall thickness of the elastic body 120 can be reduced. In this way, the thickness of the conductive base 100 which utilizes the elastic body 120 can be reduced, thereby fulfils the thinning requirement of the electronic device 10.

Moreover, the elastic body 120 in the present embodiment further includes a position limiting portion 126 and a side wall 128. The side wall 128 is adjacent to a side edge of the bottom plate 122. The position limiting portion 126 is connected to a top edge of the side wall 128 and extends toward the second opening 122a. The position limiting portion 126 connects to the bottom plate 122 through the side wall 128. When the force F is removed from the contacting portion 124a of the elastic part 124, the elastic part 124 would bend with respect to the bottom plate and moves further away from the first opening 112. The position limiting portion 126 can control the rebound of the elastic part 124. In other words, by installing the position limiting portion 126, a distance D (indicated in FIG. 2) between the contacting portion 124a and the bottom plate 122 can be kept such that the distance D is not too large. In this way, the status in which the rebound of the elastic part 124 is too large after the releasing force F is removed can be avoided, so as to prevent the elastic part 124 from being hooked and deformed permanently during the installation process. Therefore, by designing the position limiting portion 126, the elastic body 120 can be maintained at a fine condition, thereby allowing the electronic device 10 equipped with the conductive base 100 to yield a better reliability. In addition, by designing the side wall 128, the structural strength of the elastic body 120 can be increased, and reducing the risk of the contacting portion 124a cannot properly contact the electronic component 14 of the electronic device 10 due to the deformation of the elastic body 120. Although in the present embodiment, the position limiting portion 126 is connected to the bottom plate 122 through the side wall 128, this configuration only serves as an example; the position limiting portion 126 can also be directly connected to the bottom plate 122 without installing the side wall 128 therebetween.

In addition, the elastic part 124 further includes a restriction part 124b, which is installed corresponding to the position limiting portion 126. The restriction part 124b can be a plate structure that is extended and bent from the elastic part 124. The restriction part 124b is installed around the contacting portion 124a. The position limiting portion 126 clamps the restriction part 124b, so as to limit the elastic part 124 within the range of the distance D. Furthermore, when the force F is removed from the contacting portion 124a, the elastic part 124 would bend with respect to the bottom plate 122. Since the elastic part 124 is elastically deformed to cause the elastic part 124 returns to the original position, the restriction part 124b abuts the position limiting portion 126, thereby limiting the rebound degree of the elastic part 124.

The contacting portion 124a of the elastic part 124 is, for example, a hemispherical shape which protrudes from a top surface 124c of the elastic part 124 in the direction away from the second opening 122a. The hemispherical contacting portion 124a has an arc surface 124d. Regardless of the direction in which the electronic component 14 of the electronic device 10 contacts the elastic body 120, the arc surface 124d is able to provide stable contacts, thereby to ensure the electronic component 14 of the electronic device 10 is electrically connected to the base body 110.

In addition, the elastic body 120 of the present embodiment can be formed integrally through suitable forming steps. The formation step is, for example, a combination of a punching process and a bending process. Furthermore, first of all, the bottom plate 122 has the second opening 122a and the elastic part 124 has the contacting part 124a by means of implementing the punching process. Subsequently, by means of implementing the bending process, the elastic part 124 would bend at an edge of the bottom plate 122 and extends above the second opening 122a to form a plate shape, thereby allowing the elastic part 124 to elastically deform when force is applied. Moreover, considering the convenience for processing, the material of the elastic body 120 can be an elastic material, and preferably metal.

Accordingly, in the elastic body and the electronic device according to the disclosure, the base body and the elastic body each respectively has the first opening and the second opening. When the elastic body is being pressed, the first opening and the second opening can commonly accommodate part of the elastic part, so the overall thickness of the elastic body can be reduced. As a result, the thickness of the conductive base which utilizes the elastic body can be reduced as well, thereby fulfilling the thinning requirement of the electronic device. Moreover, when the elastic body includes the position limiting portion, the permanent deformation due to excessive deformation can be avoided. Therefore, the elastic body can be maintained at an excellent condition, thereby allowing the electronic device equipped with the conductive base to yield a better reliability. Furthermore, when the contacting portion of the elastic part is hemispherical, a stable electrical connection between the electronic component of the electronic device and the base body can be provided.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. An elastic body, comprising:
   a bottom plate, which has an opening;
   a position limiting portion, connected to the bottom plate and extended toward the opening; and
   an elastic part, connected to the bottom plate, wherein the elastic part has a contacting portion, the contacting portion is installed corresponding to the opening, and the position limiting portion keeps a distance between the contacting portion and the bottom plate, wherein the elastic part further has a restriction part having a plate shape structure extended and bent from the elastic part, the restriction part is installed around the contacting portion and corresponding to the position limiting portion, the position limiting portion clamps the restriction part to limit the elastic part within the range of the distance, and when the elastic part bends with respect to the bottom plate, the restriction part abuts the position limiting portion, wherein the contacting portion is hemispherical shape.

2. The elastic body according to claim 1, further comprising a side wall, the side wall is connected to a side edge of the bottom plate, wherein the position limiting portion is connected to a top edge of the side wall.

3. The elastic body according to claim 1, wherein the elastic part bends from an edge of the bottom plate and extends above the opening.

4. The elastic body according to claim 1, wherein the elastic body is formed integrally as a piece.

5. The elastic body according to claim 3, wherein the elastic part is plate shape and forms a flexible arm after bending.

6. An electronic device, comprising:
a casing;
an electronic component, installed in the casing;
a conductive base, installed in the casing, wherein the conductive base comprising:
a base body, which has a first opening;
an elastic body, comprising:
   a bottom plate, installed on the base body and has a second opening, wherein the first opening is communicated with the second opening; and
   an elastic part, connected to the bottom plate and has a contacting portion, wherein the contacting portion is installed corresponding to the second opening, and the contacting portion contacts the electronic component, wherein the elastic part further has a restriction part having a plate shape structure extended from the elastic part, the restriction part is installed on the periphery of the contacting portion and corresponding to the position limiting portion, the position limiting portion clamps the restriction part to limit the elastic part within the range of the distance, and when the elastic part rebounds, the restriction part abuts the position limiting portion to maintain a maximum amount of the distance, wherein the contacting portion is hemispherical shape.

7. The electronic device according to claim 6, wherein the elastic body further comprises a position limiting portion which connects to the bottom plate and extends toward the second opening, and the position limiting portion keeps a distance between the contacting portion and the bottom plate.

8. The electronic device according to claim 7, wherein the elastic body further comprises a side wall, the side wall connects to a side edge of the bottom plate, and the position limiting portion connects to a top edge of the side wall.

9. The electronic device according to claim 6, wherein the elastic part bends from an edge of the bottom plate and extends above the second opening.

10. The electronic device according to claim 6, wherein the elastic body is formed integrally as a piece.

11. The electronic device according to claim 9, wherein the elastic part is plate shape and forms a flexible arm after bending.

* * * * *